July 8, 1941.  L. C. PARENT  2,248,893

DEVICE FOR SEPARATING BEESWAX FROM HONEY

Filed Feb. 26, 1940

Inventor
Leo C. Parent
By Munn, Anderson & Liddy
Attorney

Patented July 8, 1941

2,248,893

UNITED STATES PATENT OFFICE 2,248,893

DEVICE FOR SEPARATING BEESWAX FROM HONEY

Leo C. Parent, East Grand Forks, Minn.

Application February 26, 1940, Serial No. 320,933

4 Claims. (Cl. 210—52.5)

This invention relates to a device for separating wax from honey.

An object of the invention is the provision of a device for continuously separating the wax from the honey in which a removable unit is mounted in the top of the container that collects the honey and wax and which has means for discharging the honey and the wax at different levels, the removable unit heating the honey and the wax before it enters the container while maintaining the wax melted above the level of the slum, wax cappings and honey so that the honey will not be overheated at any time with possible injury to the honey.

A further object of the invention is the provision of a device for separating wax from honey in a substantially continuous manner in which the wax level is maintained at a higher level than the level of the honey in a container so that no honey will pass through a discharge for the melted wax, a removable heating unit which provides a hopper for directing mixed honey and wax to the center of the container not only supplying heat to the wax and honey at a predetermined temperature, but melting the wax above the level of the honey in the container, the wax being melted at a higher temperature than the temperature of the heat applied to the incoming wax and honey, the hopper being removable as a unit so that it may be thoroughly cleansed independently of the cleaning of the container.

This invention will be best understood from a consideration of the following detailed description in view of the accompanying drawing forming a part of the specification; nevertheless, it is to be understood that the invention is not confined to the disclosure, being susceptible of such changes and modifications as define no material departure from the salient features of the invention as expressed in the appended claims.

Figure 1:
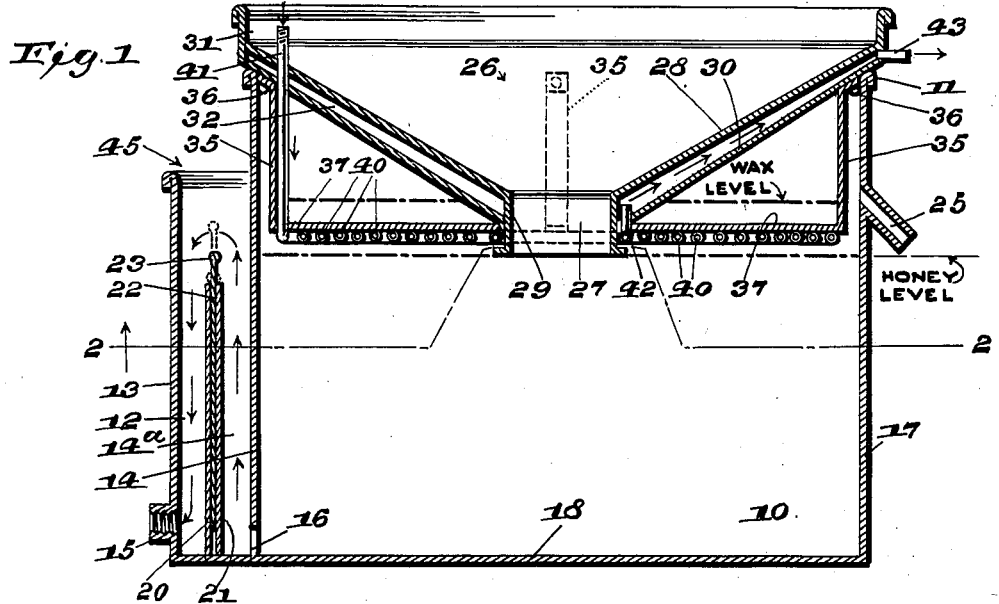
Figure 1 is a vertical longitudinal section of the separator constructed in accordance with the principles of my invention.
Figure 2:
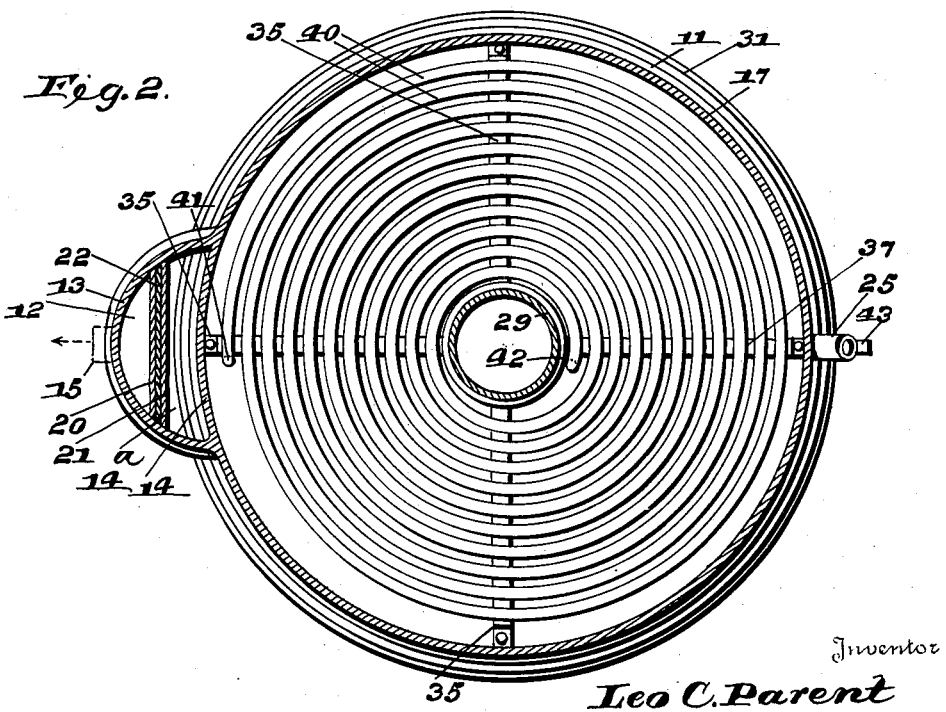
Figure 2 is a longitudinal section taken along the lines 2—2 of Figure 1.

Referring more particularly to the drawing, 10 generally designates a container which may be of any transfiguration in cross section, but in this particular instance it is shown as cylindrical. The upper edge of the container is provided with a reinforcing flange 11 for a purpose which will be presently explained.

A semi-circular compartment 12 is enclosed by a metal wall 13 and a portion 14 of the container 10. The compartment 12 is provided with a discharge opening 15 in the wall 13 and an inlet opening 16 is formed in the bottom of that portion of the circular wall 17 of the container which is confined between the side edges of the wall 13 and designated by the numeral 14. Both of the openings are adjacent a bottom 18 of the container 17.

A pair of spaced partitions 20 and 21 have their side edges secured to the inner face of the wall 13 and are located substantially midway of the wall 13 and the portion of the wall 17. A sliding gate 22 is neatly fitted between the partitions 20 and 21 and may be raised or lowered by grasping the upper free end 23 of the partition. Instead of two partitions 20 and 21 it may only be necessary to employ one partition with spaced flanges connected to the wall 13 so that the partition and flanges will act as a guide for the sliding gate 22. Thus, it will be seen that when the gate 22 is raised a higher level of honey may be maintained in the container 10, while on the other hand when the gate is lowered a lower level of honey will be maintained in this container.

Diametrically opposite the openings 15 and 16 is a discharge spout 25 in communication with the container 10 and at a point above the upper edge of the partition 20 so that the melted wax may be discharged from the container always at a higher level than the level of the honey in order to prevent any of the honey from being discharged through the spout 25 with the wax.

A hopper 26 forms a removable unit for the container and merely rests upon the reinforced upper edge 11 of the container and in this way the hopper may be removed from time to time and thoroughly cleansed without disturbing the contents of the container 10. The hopper has a centrally disposed and depressed opening 27 which leads directly into the center of the container 10 and for this purpose the frusto-conically shaped wall of the hopper is extended downwardly at its lowermost end into a cylindrical portion 29.

A second wall 30 which conforms to the shape of the wall 28 of the hopper has its lower inner edge secured to the outer side wall of the cylindrical member 29 while its upper edge is of cylindrical shape as shown at 31 and extends up above the upper edge of the wall 28. The upper outer edge of the wall 28 is secured to the cylindrical portion 31 of the member 30. The walls 28 and 30 are spaced from each other to provide a heating chamber 32 therebetween.

A plurality of L-shaped brackets 35 have their upper ends, as shown at 36, secured to the bottom face of the member 30 adjacent the periphery but inwardly of the cylindrical wall 17 of the container 10. The horizontal portions 37 of these brackets are extended inwardly and are secured to the lower end of the cylindrical member 29.

A coil, generally designated by the numeral 40, is connected in any approved manner with the under faces of the portions 37 of the brackets 35. This coil is provided with an inlet pipe 41 which extends through the members 28 and 30 adjacent one of the brackets 35. The pipe 41 is connected to the outer end of the coil while a short pipe 42 connects the inner end of the coil adjacent the circular member 29 with the heating chamber 32. A discharge pipe 43 is in communication with the heating chamber 32 at a point directly opposite the inlet pipe 41 and this pipe is connected to the cylindrical member 31 of the member 30.

Steam is supplied to the pipe 41 which passes through the coils 40 and discharged steam enters the chamber 32 by way of the pipe 42. In view of the fact that a greater portion of the heat is utilized in the coils for melting the wax floating on the honey in the container 10 the temperature of the chamber 32 will be lower than the temperature of the coils 40.

It will be seen by this construction that the hopper 26 rests upon the upper reinforced edge 11 of the container 10 and may be readily removed therefrom with the heating coils 40 as a unit since the hopper has no connection whatever with the container.

The upper end 45 of the wall 13 is located above a horizontal plane passing through the upper edge of the discharge opening 25 and the upper end of this chamber is open so that the gate valve 22 may be pulled upwardly and outwardly from the compartment 12.

The operation of my device is as follows:

Steam from any suitable source is introduced into the pipe 41 and this steam passes through a short pipe 42 which connects the inner end of the coil with the heating chamber 32.

As the operator uncaps combs, the cappings will fall into the hopper 26 and as the cappings spread over the hopper they will be heated to some extent but not at a temperature where there will be any danger of injuring the honey. However, the temperature is such that the wax cappings will be loosened from the honey and will move upwardly above the honey in the container.

As the wax rises it must pass through the heated coils 40 and be melted and this wax will rise to a point above the coils. The wax cappings, however, will consequently be moving up to the heated coils so that as the wax is melted it will move to a higher level than the honey level, although the honey level is always maintained sufficiently below the heating coils 40 to prevent the honey from coming in contact with the heated coils.

There is a certain amount of slum contained in the wax and honey which is poured into the container 10 and this slum will collect above the wax cappings and above the heated coils 40 while the melted wax will rise above the slum.

The various levels of the melted wax, the slum and the wax cappings are maintained so that the slum will not remain below the heating coils or at a level with the heated coils. Otherwise the slum will prevent the wax cappings from coming in contact with the heated coils and thus prevent the wax cappings from efficiently melting.

The melted wax is discharged through the spout 25 and collected in containers and removed from time to time. The honey passes through the opening 16 in the wall of the container 10 and upwardly through a chamber 14$^a$ over the top of the gate 22 and thence into the chamber 12 where it is discharged through the opening 15. The honey is collected at a point diametrically opposite the collection of the wax from the spout 25.

By raising or lowering the gate valve 22 the level of the honey can be varied in the container 10 so that the wax cappings can always be maintained in contact with the heated coils 40 while the slum and melted wax will be maintained at a level above the plane passing through the coils 40.

I claim:

1. A device for separating wax and honey comprising a container, a honey overflow from said container adapted to maintain a predetermined level of the honey in the container, a shielding chamber for said overflow in communication with the lower portion of the container, an overflow for melted wax located above the level of the honey, a combined heating means for the wax and honey and for melting the wax above the level of the honey and, removably supported from the top of the container, said heating means including a unit for heating the wax and honey before said wax and honey enter the container, and a unit for melting the wax above the level of the honey, means for causing the first-mentioned heating unit to be maintained at a lower temperature than the second unit, said combined heating means having an opening for supplying the container with wax and honey.

2. A device for separating wax and honey comprising a container, a honey overflow from said container adapted to maintain a predetermined level of the honey in the container, a shielding chamber for said overflow in communication with the lower portion of the container, an overflow for melted wax located above the level of the honey, a combined heating means for the wax and honey and for melting the wax above the level of the honey, the combined heating means forming a unit which is removably supported from the top of the container and including a horizontally disposed coil located above the honey level for melting wax and a conically shaped plate upon which the wax and honey are poured, means supplying a heating fluid to the coil, said plate having a central opening leading into the container, means for heating the depressed plate at a lower temperature than that of the heating coils.

3. A device for separating wax and honey comprising a container, a honey overflow from said container adapted to maintain a predetermined level of the honey in the container, a shielding chamber for said overflow in communication with the lower portion of the container, an overflow for melted wax located above the level of the honey, a removable unit located in the top of the container and supported thereby, said unit including a pair of spaced conically shaped walls and provided with a central opening, said spaced walls being connected together at the inner and outer peripheries to form a heating chamber, a spiral heating coil located below the chamber, means connecting the coil at the outer end with a source of heated fluid, means connecting the inner end of the coil with the chamber and means supporting the coil.

4. A device for separating wax and honey comprising a container, a honey overflow from said container adapted to maintain a predetermined level of the honey in the container, a shielding chamber for each overflow in communication with the lower portion of the container, an overflow for melted wax located above the level of the honey, a heating device for the wax and honey adjacent the top of the container and including a plurality of walls forming a heating chamber and a central passage through which the honey and wax enter the container, one wall forming the top upon which the honey and wax are poured before they enter the passage, a spiral heating coil located below the chamber for melting the wax above the level of the honey, means connecting the coil at the outer end with a source of heated fluid, means connecting the inner end of the coil with the chamber and means supporting the coil.

LEO C. PARENT.